Sept. 23, 1941.   H. A. RAY   2,257,023
FISHING REEL
Filed Dec. 7, 1938   2 Sheets-Sheet 1
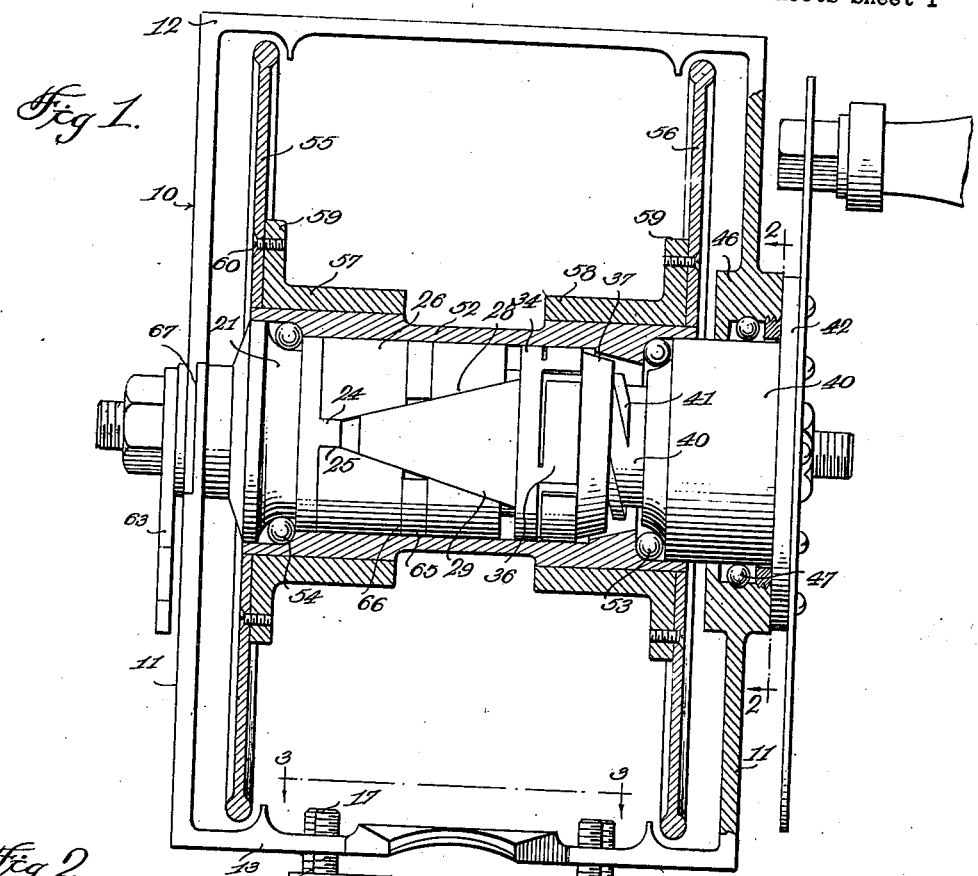
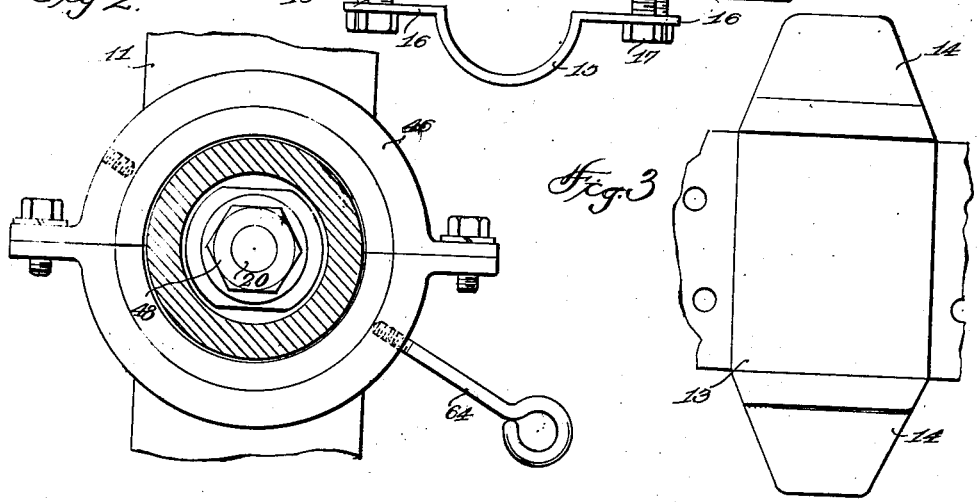
Hjalmer A. Ray
INVENTOR
BY Victor J. Evans & Co.
ATTORNEYS Sept. 23, 1941.  H. A. RAY  2,257,023
FISHING REEL
Filed Dec. 7, 1938  2 Sheets-Sheet 2
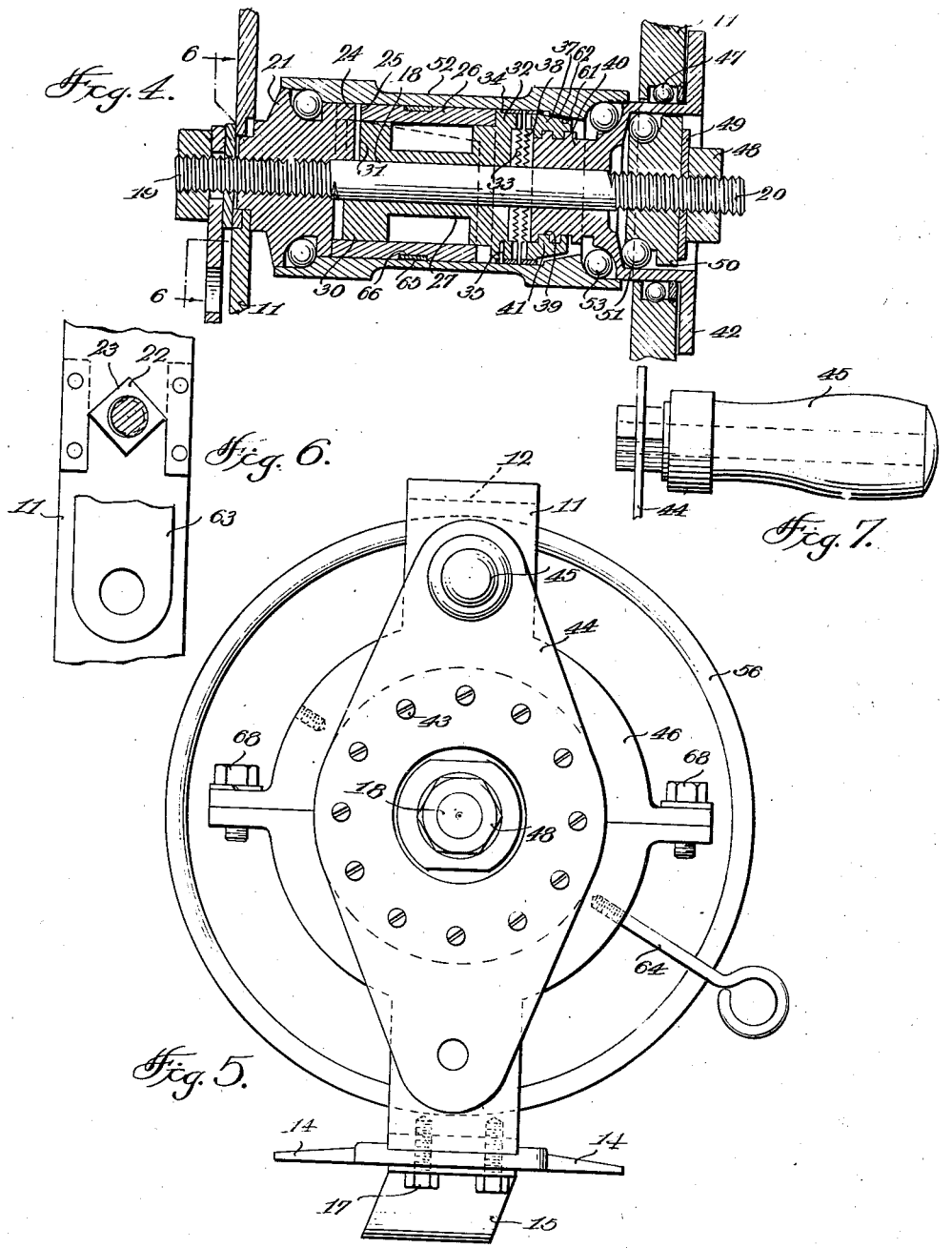
Hjalmer A. Ray, INVENTOR
BY Victor J. Evans & Co.
ATTORNEYS Patented Sept. 23, 1941

2,257,023

UNITED STATES PATENT OFFICE 2,257,023

FISHING REEL

Hjalmer A. Ray, Fairhaven, Mass.

Application December 7, 1938, Serial No. 244,478

1 Claim. (Cl. 242—84.5)

This invention relates to fishing reels and has for an object to provide a fishing reel having a hub brake similar to a bicycle hub coaster brake to permit the fishing line to be wound in, or allowed to run out, or any desired brake pressure be brought to bear on the line, or even brake pressure applied to hold the line at rest, all of which can be accomplished by manipulating the same crank handle.

A further object of the invention is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a longitudinal sectional view of a fishing reel constructed in accordance with the invention.

Figure 2 is a cross sectional view taken on the line 2—2 of Figure 1.

Figure 3 is a cross sectional view taken on the line 3—3 of Figure 1 showing part of the clamp for attaching the reel to a fishing pole, in top plan.

Figure 4 is a longitudinal sectional view of the hub coaster brake of the reel.

Figure 5 is an end elevation of the reel looking toward the control handle thereof.

Figure 6 is a detail cross sectional view taken on the line 6—6 of Figure 4 and showing the nut for locking one of the brake ball race collars to the reel frame.

Figure 7 is a front elevation of the reel handle partly broken away.

Referring now to the drawings in which like characters of reference designate similar parts in the various views, 10 designates a substantially rectangular frame, having sides 11, a top 12 and a bottom 13, the latter having arcuate extensions 14 at the center thereof adapted to fit longitudinally of a fishing pole. The frame is clamped to the fishing pole through the medium of an arcuate clamp 15 having perforated lugs 16 through which, and the bottom of the frame, clamp screws 17 are passed.

An axle 18 is provided with threaded ends 19 and 20. Upon one threaded end 19 is screwed a ball race collar 21 provided on its outer face with an integral square projection 22, best shown in Figure 6, which fits in a correspondingly shaped opening 23 formed in the adjacent side 11 of the frame, as best shown in Figure 6, to secure the collar stationary.

The collar 21 is provided on its inner face with a lug 24, to enter a corresponding recess 25 in the confronting end of a split spring brake sleeve 26 which surrounds a sleeve 27 which is loose upon the axle 18.

The split 28 in the spring sleeve is wedge shaped to receive a wedge 29 for expanding the sleeve. The sleeve 27 is provided in its head 30 with a recess 31 to receive the lug 24 which also enters the spring sleeve recess 25, to hold the sleeve against rotation while permitting it to move to a limited extent longitudinally of the axle.

The opposite head 32 of the sleeve is provided with a ratchet face 33 and the ratchet face is surrounded by a spring band 34 which is pinned to the sleeve as shown at 35. As best shown in Figure 1 the spring band 34 is provided with a plurality of arcuate spring tongues 36. The tongues overlap and yieldably bear against the outer surface of a clutch collar 37 which surrounds the axle and is provided with a ratchet face 38 adapted to mesh with the ratchet face 33 of the sleeve. The inner periphery of the collar 37 is provided with coarse screw threads 39. A driving hub 40 having coarse screw threads 41, is loosely mounted on the axle and screws into the collar 37.

The hub is provided with a flange 42 to which is bolted, as shown at 43, a crank 44 having a handle 45 which may be interchangeably mounted on either end of the crank. The hub is rotatably received in a bearing box 46 in the side 11 of the frame, there being ball bearings 47 in the opening promoting free movement of the hub. The hub is retained in position through the medium of a nut 48 and a washer 49 on the threaded end 20 of the shaft, the washer bearing against a collar 50 between which and the driving hub ball bearings 51 are disposed.

A reel spool 52 envelopes the brake mechanism above described and ball bearings 53 and 54 are interposed between the ends of the spool and the collar 21 and driving hub 40. Circular side plates 55 and 56, best shown in Figure 1, are secured to the spool through the medium of sleeves 57 and 58 which are fixed to the ends of the spool and have flanges 59 which are secured to the inner faces of the side plates through the medium of screws 60 or other connectors.

The clutch collar 37 is provided with a tapered exterior surface 61 which confronts a similar tapered surface 62 on the reel spool 52. A perforated bar 63 is secured to the threaded end 19 of the shaft and an eye screw 64 is secured to the bearing 46 for the purpose of attaching a harness.

A split bar spring 65 is secured in a groove 66 in the split spring sleeve 26 to reinforce the sleeve against breaking when the wedge 29 is pushed into the split 28.

As best shown in Figures 1 and 7 the frame is formed of an upper and lower section, this being accomplished by interfitting similar half sections of the side 11 as shown at 67 in Figure 1 and forming the bearing box 46 of two similar sections bolted together as shown at 68 in Figure 5.

In operation, assuming the parts to be in the positions shown in Figures 1 and 4, their relative positions are the positions they occupy for coasting when the reel is freely rotating under impulse of the fishing line. In this position of the parts, the reel spool 52 is free to rotate on its ball bearings 53 and 54 without turning any of the mechanism inside it since the tapered surface 61 on the clutch collar 37 is out of contact with the tapered surface 62 on the reel spool 52. When the operator desires to reel up the line, the handle 45 is rotated forwardly from the operator in the customary manner, and this rotation screws the thread 41 on the driving hub 40 into the threaded collar 37, thus drawing the latter endwise and engaging the outer tapered surface 61 thereof with the inner tapered surface 62 of the reel spool, which results, by the ensuing friction clutch action, in binding the reel spool to the collar and consequently to the driving hub 40 so that turning of the handle also turns the reel to reel in the line.

The braking action is accomplished by turning the handle in a retrograde direction, or toward the operator, which produces reversal of the driving hub 40 and resultant turning of the threads 41 in a direction to force the collar 37 endwise and engage its ratchet face 38 with the ratchet face 33 on the sleeve 27. Thereupon the sleeve 27 forces the wedge 29 into the split 28 of the spring brake sleeve 26 to expand the sleeve with great pressure against the reel spool 52 thus locking the latter stationary to the stationary shaft 18. The braking effect will be proportional to the distance the wedge is driven into the split to expand the spring sleeve against the reel spool 52. Thus any desired brake pressure may be applied to the fishing line to reduce the time required to play heavy fish.

From the above description it is thought that the construction and operation of the invention will be fully understood without further explanation.

What is claimed is:

A fishing reel comprising, a frame having spaced sides, a spindle extending through the sides, a ball race collar on one end of the spindle fixed to one of said sides, a ball race collar on the other end of the spindle, a driving hub on the spindle supported upon the last named ball race collar and rotatably mounted in the other of said sides, a crank handle on the driving hub for rotating the hub, a reel spool rotatably supported at the ends of the driving hub and on one of said ball race collars, a clutch collar on the driving hub, a coarse thread connection between the collar and the driving hub effecting movement of the clutch collar longitudinally of the spindle when the driving hub is rotated in one direction to frictionally engage the clutch collar with the spool and clutch the spool for rotation as a unit with the driving hub to reel in a fishing line, retrograde movement of the driving hub by said crank handle moving the clutch collar to de-clutched position to free the spool for casting the fishing line, a resilient split ring brake sleeve on the spindle having the split thereof wedge shaped, a wedge member on the spindle movable by the clutch collar when the clutch collar is moved endwise by retrograde movement of the crank and driving hub to enter said split to expand the brake sleeve against the inner periphery of the spool to exert a drag on the fishing line when the driving hub is turned in said retrograde direction after de-clutching the clutch collar from the spool, and means carried by said sides for securing the frame to a fishing rod.

HJALMER A. RAY.